United States Patent
Ahn

(10) Patent No.: US 9,420,184 B2
(45) Date of Patent: Aug. 16, 2016

(54) CAMERA MODULE HAVING A HANDSHAKE CORRECTION FUNCTION

(71) Applicant: LG INNOTEK CO., LTD., Seoul (KR)

(72) Inventor: Jae Wook Ahn, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 0 days.

(21) Appl. No.: 14/409,555

(22) PCT Filed: Jan. 29, 2013

(86) PCT No.: PCT/KR2013/000697
§ 371 (c)(1),
(2) Date: Dec. 19, 2014

(87) PCT Pub. No.: WO2014/003280
PCT Pub. Date: Jan. 3, 2014

(65) Prior Publication Data
US 2015/0201127 A1    Jul. 16, 2015

(30) Foreign Application Priority Data

Jun. 28, 2012  (KR) .................. 10-2012-0069853

(51) Int. Cl.
| | | |
|---|---|---|
| *H04N 5/228* | (2006.01) | |
| *H04N 5/232* | (2006.01) | |
| *G03B 5/02* | (2006.01) | |
| *H04N 5/225* | (2006.01) | |
| *G02B 13/00* | (2006.01) | |

(52) U.S. Cl.
CPC ........ *H04N 5/23248* (2013.01); *G02B 13/0015* (2013.01); *G03B 5/02* (2013.01); *H04N 5/2253* (2013.01); *H04N 5/2257* (2013.01); *G03B 2205/0015* (2013.01); *G03B 2205/0069* (2013.01)

(58) Field of Classification Search
CPC ................................................... H04N 5/23248
See application file for complete search history.

(56) References Cited

U.S. PATENT DOCUMENTS

| | | | | |
|---|---|---|---|---|
| 8,711,235 B2* | 4/2014 | Chan | .................. | H04N 5/23258 348/208.5 |
| 9,049,375 B2* | 6/2015 | Wade | ........................ | G03B 5/00 |
| 2008/0049109 A1* | 2/2008 | Teramoto | ............. | H04N 5/2251 348/208.7 |
| 2010/0316363 A1 | 12/2010 | Chou | ............................. | 396/55 |

(Continued)

FOREIGN PATENT DOCUMENTS

| | | |
|---|---|---|
| KR | 10-2010-0109331 A | 10/2010 |
| KR | 10-2010-0109727 A | 10/2010 |

(Continued)

OTHER PUBLICATIONS

International Search Report dated May 16, 2013 issued in Application No. PCT/KR/2013/000697.

(Continued)

*Primary Examiner* — Gary C Vieaux
(74) *Attorney, Agent, or Firm* — KED & Associates LLP

(57) ABSTRACT

An exemplary embodiment of the present invention includes a PCB (Printed Circuit Board) mounted with an image sensor, a plurality of coil units arranged at an upper surface of the PCB, a housing member arranged at the upper surface of the PCB and provided with a magnet at a position corresponding to that of the coil unit, and a ball guide unit arranged at a surface opposite to the PCB of the housing member.

20 Claims, 4 Drawing Sheets

(56) References Cited

U.S. PATENT DOCUMENTS

2011/0122267 A1    5/2011    Ahn et al. .................. 348/208.7
2011/0304764 A1    12/2011    Shigemitsu et al.

FOREIGN PATENT DOCUMENTS

| KR | 1020090028138 A | * | 10/2010 | |
| TW | 2011-42348 | | 12/2011 | |
| TW | 2012-11579 | | 3/2012 | |
| WO | WO 2011-155318 A1 | | 12/2011 | |
| WO | WO 2011155315 A1 | * | 12/2011 | ............... G03B 5/00 |

OTHER PUBLICATIONS

Taiwanese Office Action issued in Application 102104809 dated May 16, 2016 (full Chinese text).

\* cited by examiner

CAMERA MODULE HAVING A HANDSHAKE CORRECTION FUNCTION

CROSS-REFERENCE TO RELATED PATENT APPLICATIONS

This application is a U.S National Stage Application under 35 U.S.C. §371 of PCT Application No. PCT/KR2013/000697, filed Jan. 29, 2013, which claims priority to Korean Patent Application No. 10-2012-0069853, filed Jun. 28, 2012, whose entire disclosures are hereby incorporated by reference.

TECHNICAL FIELD

The teachings in accordance with exemplary and non-limiting embodiments of this invention relate generally to a camera module.

BACKGROUND ART

The recent trend is that camera modules used for electronic devices are mounted with various hand-shake correction schemes automatically compensating an image instability caused by camera shake, that is, vibration of a camera apparatus typically caused by user hand, in addition to auto-focusing automatically adjusting an image focus.

The hand-shake correction scheme is a function of minimizing image instability or error caused by handshake by controlling an actuator to a direction opposite to movement of an image captured by an image sensor, in a case the image captured on the image sensor is shaken by a user hand, external shock or vibration.

As one of representative prior art capable of realizing a handshake prevention function, Korean Patent Application No. 10-2010-0952620, registered on Apr. 6, 2010, discloses a camera module provided with a handshake prevention actuator in which a plurality of wires coupled at one side to a cover of a camera module, and coupled at the other side to a bobbin, is provided to compensate the handshake by interaction between an electromagnet installed at a periphery of the bobbin and a magnet arranged at a position opposite to the electromagnet inside the cover.

DISCLOSURE

Technical Problem

Accordingly, it is an object of the present invention to provide an actuator-mounted, structurally improved camera module capable of being configured in a simple structure with an inexpensive cost.

Technical Solution

In order to accomplish the above object, in one general aspect of the present invention, there is provided a camera module, the camera module comprising: a PCB (Printed Circuit Board) mounted with an image sensor; a plurality of coil units arranged at an upper surface of the PCB; a housing member arranged at the upper surface of the PCB and provided with a magnet at a position corresponding to that of the coil unit; and a ball guide unit arranged at a surface opposite to the PCB of the housing member.

Preferably, but not necessarily, the housing member may be movable to a direction parallel with a sensor surface of the image sensor by an electromagnetic interaction between the coil unit and the magnet.

Preferably, but not necessarily, the camera module may further comprise a cover member coupled to the PCB and mounted therein with the housing member.

Preferably, but not necessarily, the housing member may be controlled in movement to a direction parallel with the sensor surface of the image sensor.

Preferably, but not necessarily, the housing member may include a frame member mounted with the magnet, and at least one or more sheets of lenses at the frame member.

Preferably, but not necessarily, the magnet may be installed at a wall surface of the frame member.

Preferably, but not necessarily, the magnet may be installed on a surface opposite to a bobbin of the frame member.

Preferably, but not necessarily, the lens may be installed at the bobbin arranged inside the frame member.

Preferably, but not necessarily, the bobbin may be wound with a coil at a periphery opposite to the magnet.

Preferably, but not necessarily, the bobbin may be reciprocably installed to an axial direction at an inside of a space unit of the frame member in response to an electromagnetic interaction with the magnet.

Preferably, but not necessarily, the at least one of the lenses may be formed with a variable lens to adjust refractive index of transmissive light.

Preferably, but not necessarily, the lens may be capable of moving any one of an extreme outer lens and an extreme rear lens.

Preferably, but not necessarily, the ball guide unit may be freely-rotatably installed at a floor surface of the frame member.

Preferably, but not necessarily, the ball guide unit may include a ball member rotatably installed at a corner portion of the frame member, and a ball guide coupled to the floor surface of the frame member to prevent the ball member from being separated.

Preferably, but not necessarily, the ball guide may include a grip unit preventing the ball member from being separated by gripping both distal ends of the ball member.

Preferably, but not necessarily, the coil unit may be installed at any one position of a surface of the PCB and an inside of the PCB and having a pattern of a wound coil operating as an electromagnet, in a case a power is applied.

Preferably, but not necessarily, the camera module may further comprise an elastic member interposed between the cover member and the frame member to elastically support a movement to an axial direction of the bobbin centrally installed at the frame member.

Preferably, but not necessarily, the camera module may further comprise a guide frame interposed between the cover member and the frame member to restrict a movement to an axial direction of the frame member and to guide a movement to a direction of the sensor surface of the image sensor.

Preferably, but not necessarily, the guide frame may be fixed in a state of being surface-contacted with the cover member.

Preferably, but not necessarily, the guide frame may be formed with an opening at a surface opposite to the bobbin in the center.

Advantageous Effects

A camera module according to an exemplary embodiment of the present invention has an advantageous effect in that handshake can be more accurately compensated by guiding a movement of an actuator to a direction parallel with a sensor surface of an image sensor using a plurality of balls.

BEST MODE

Now, the camera module according to exemplary embodiments of the present invention will be described in detail with reference to the accompanying drawings.

Figure 1:
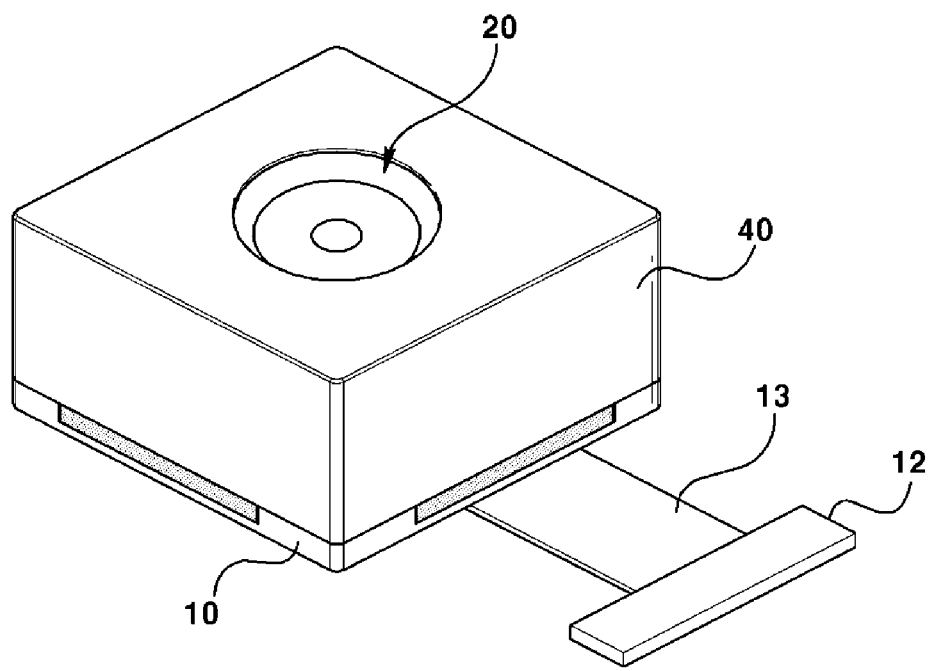
FIG. 1 is a schematic view illustrating a camera module according to an exemplary embodiment of the present invention.
Figure 2:
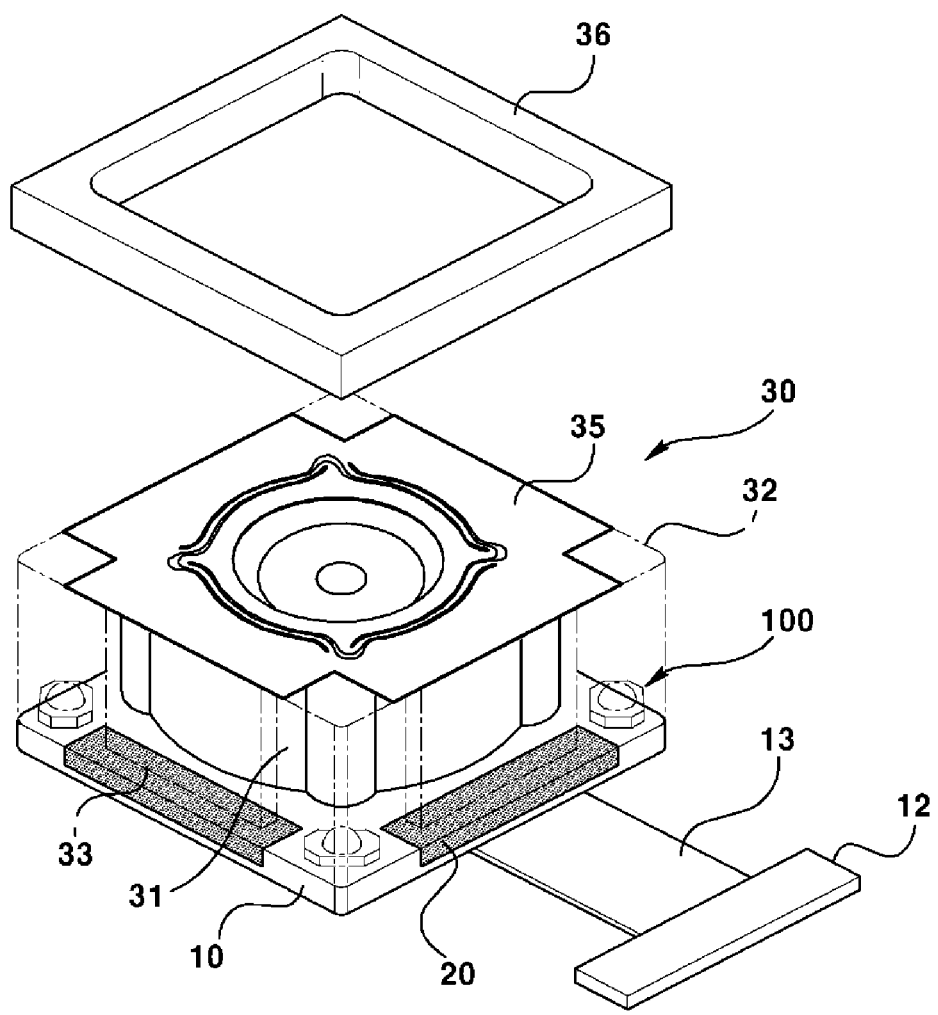
FIG. 2 is a schematic view illustrating an arrangement relationship of a ball guide unit by transparently configuring a portion of a cover of FIG. 1.
Figure 3:
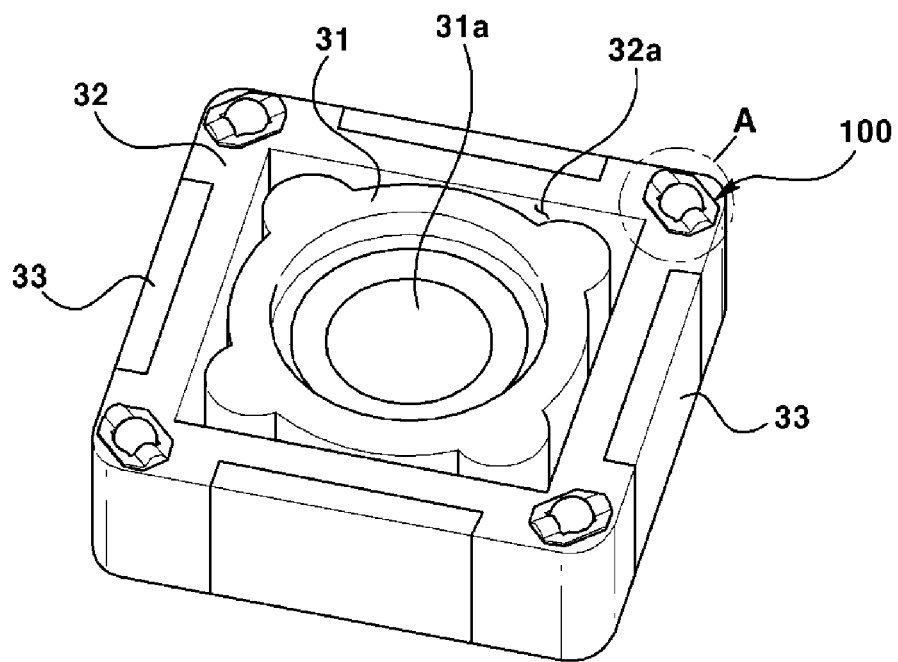
FIG. 3 is a bottom perspective view illustrating a housing member.
Figure 4:
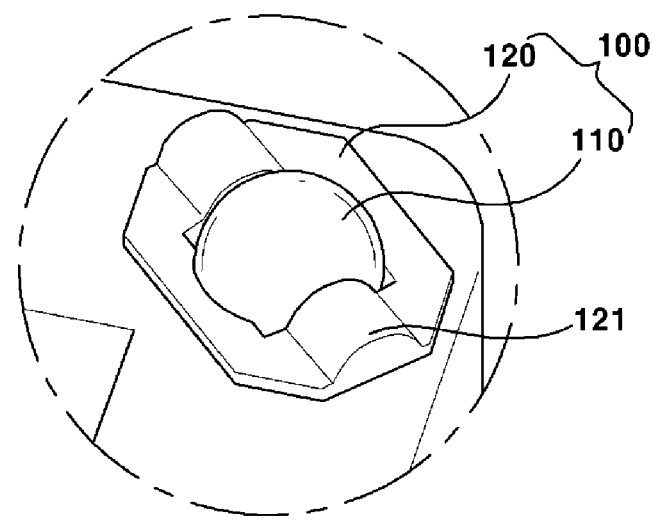
FIG. 4 is an enlarged view illustrating a ball guide unit installed at 'A' portion of FIG. 3.
Figure 5:
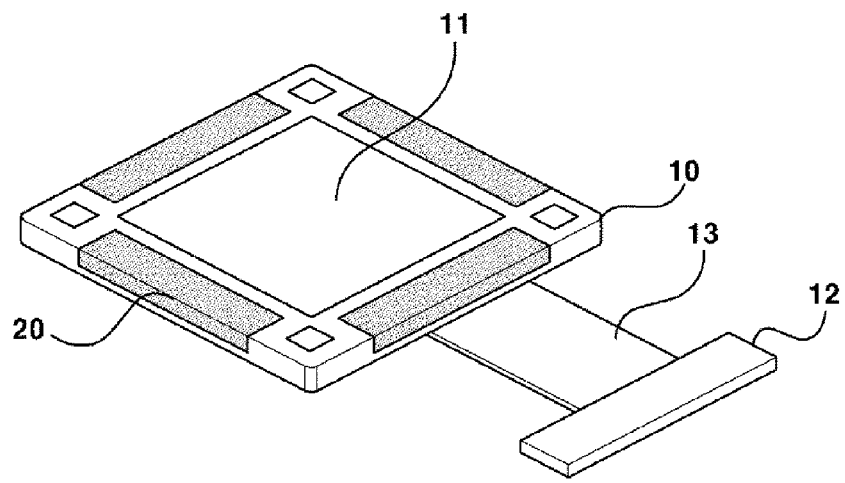
FIG. 5 is a perspective view illustrating a PCB mounted with an image sensor.
Figure 6:
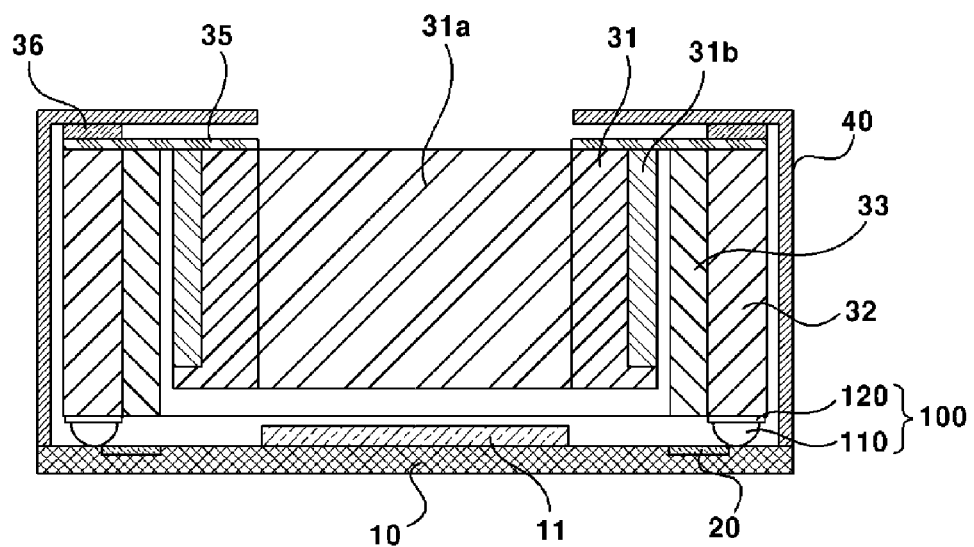
FIG. 6 is a schematic cross-sectional view illustrating a camera module according to an exemplary embodiment of the present invention.

FIG. 1 is a schematic view illustrating a camera module according to an exemplary embodiment of the present invention, FIG. 2 is a schematic view illustrating an arrangement relationship of a ball guide unit by transparently configuring a portion of a cover of FIG. 1, FIG. 3 is a bottom perspective view illustrating a housing member, FIG. 4 is an enlarged view illustrating a ball guide unit installed at 'A' portion of FIG. 3, FIG. 5 is a perspective view illustrating a PCB mounted with an image sensor, and FIG. 6 is a schematic cross-sectional view illustrating a camera module according to an exemplary embodiment of the present invention.

Referring to FIGS. 1 and 2, a camera module according to an exemplary embodiment of the present invention may include a PCB (10), a coil unit (20), a housing member (30), a cover member (40) and a ball guide unit (100).

An image sensor (11, see FIG. 5) may be installed at an approximately central vicinity of the PCB (10) to enable a reading an image, and image information read from the image sensor (11) may be outputted to a predetermined controller via a connection terminal (12) connected to an F-PCB (Flexible-PCB, 13).

Referring to FIGS. 2 and 5, the coil unit (20) may be positioned at an upper surface of the PCB (10), which is a surface opposite to a frame member (32) of the housing member (30, described later), to control a movement to a shift direction parallel with the image sensor (11) of the housing member (30). The coil unit (20) will be described later along with configuration of the housing member (30).

Referring to FIGS. 2 and 3, the housing member (30) may include an actuator equipped with at least any one function of an auto focus function for compensating an image captured by the image sensor (11, see FIG. 5) and a handshake prevention function. According to an exemplary embodiment of the present invention, the housing member (30) may be positioned with a bobbin (31) mounted with a plurality of lenses and a frame member (32) centrally arranged by the bobbin (31).

The bobbin (31) may be injection-molded with a material including plastic, and may be arranged therein with one or more sheets of lenses (31a) to transmit an outside image to the image sensor. At this time, a separate lens may be formed at an upper surface or a bottom surface of the bobbin (31) to realize an auto focusing function and/or handshake prevention function by liftably controlling an extreme upper lens or an extreme bottom lens. Furthermore, one or more lenses (31a) mounted at an interior of the bobbin (31) may be fixed to a lens barrel and coupled and fixed at a center of the bobbin (31) to liftably control an entire of the bobbin (31), whereby the auto focusing function and/or handshake prevention function may be realized.

Alternatively, any one of the lenses installed at an interior of the bobbin (31) may be configured with a structure capable of varying a refractive index to realize the auto focusing function. The auto focusing function may be variably set in addition to the abovementioned configurations.

Meanwhile, in case of realizing the auto focusing function by lifting the bobbin (31) to a direction parallel with an optical axis, a periphery of the bobbin (31) may be wound with a coil (31b) as illustrated in FIG. 6, and a surface opposite to the bobbin (31) may be arranged with a magnet (33, described later) to allow the bobbin (31) to lift to a direction parallel with an optical axis at a center of the frame member (32). A general configuration for controlling the abovementioned movement is same as a control method of a conventional voice coil motor.

The frame member (32) may be formed at an inside of the cover member (40) and supported by the ball guide unit (100) to allow moving to a direction parallel with a sensor surface of the image sensor mounted at the PCB (10). The frame member (32) may be provided in an approximately cubic shape. In this case, the frame member (32) may be formed at an approximate center with a space unit (32a), and the space unit (32a) may be reciprocably arranged with the bobbin (31).

Referring to FIG. 2, the bobbin (31) may be installed at an upper surface with an elastic member (35) mounted at an upper surface of the frame member (32), where the elastic member (35) may elastically support the lifting operation of the bobbin (31). The elastic member (35) may be fixed to an entire upper surface of the frame member (32), and may be so installed as to move in conjunction with movement of the frame member (32).

Meanwhile, although not illustrated, in a configuration where the auto focusing function is realized by movement of any one lens positioned at an upper surface, at a bottom surface or at an inside of the bobbin (31), the bobbin (31) may maintain a fixed state inside the frame member (32). The cover member (40) may serve to form an exterior look of the camera module, being made of a metal material, and function as a shield can blocking electromagnetic wave.

Meanwhile, as illustrated in FIGS. 2 and 5, a surface opposite to the magnet (33) installed at the frame member (32) of the PCB (10) may be formed with at least four (4) coil units (20). The coil unit (20) may be installed on a surface or at an inside of the PCB (10) and receive a power to operate as an electromagnet by being formed with a fine pattern wound with fine coils. Thus, in a case the power is applied to the coil unit (20) to generate an electromagnetic interaction with the magnet (33), a shift direction and a moving distance of the frame member (32) can be adjusted by a current amount applied to the plurality of coil units (20).

In a case the frame member (32) is shift-controlled to a horizontal direction of the PCB (10) by the electromagnetic interaction between the coil unit (20) and the magnet (33), the handshake compensation of an image captured by the image sensor (11) may be performed. That is, in a case the frame member (32) is shift-controlled, an optical axis passing through the bobbin (31) can be adjusted, because the bobbin

(31) centrally installed at the frame member (32) is also moved in conjunction with a shift movement of the frame member (32).

Furthermore, a guide frame (36) may be interposed between the cover member (40) and the frame member (32) at an upper surface of the frame member (32). One side of the guide frame (36) may surface-contact the cover member (40) while the other opposite side may surface-contact the frame member (32) and the elastic member (35) installed at an upper surface of the frame member (32) to restrict the frame member (32) and the elastic member (35) to a direction parallel with the optical axis, and to also guide a basic position to a horizontal direction of the frame member (32). Thus, the moving direction of the frame member (32) may be so guided as to move to a direction parallel with the sensor surface of the image sensor (11) by the guide frame (36).

In a case the coil unit (20) formed at the surface of the PCB (10) is applied with a power to generate the electromagnetic force, the frame member (32) may move to a direction parallel with the sensor surface of the image sensor (11) in response to interaction with the magnet (33) installed at the frame member (32), where the movement to a direction parallel with the optical axis may be restricted.

Thus, the auto focusing function can be separately realized away from the shift movement of the frame member (32). By way of non-limiting example, an actuator individually operating with the frame member (32) can be configured as in the movement to an optical axis of the bobbin (31) installed inside the frame member (32) or the adjustment of refractive index of at least one lens, and the camera module according to an exemplary embodiment of the present invention may include the ball guide unit (100) to allow softly guiding the movement to a shift direction of the frame member (32) for the handshake compensation function. The ball guide unit (100) may include a ball member (110) and a ball guide (120).

Referring to FIGS. 3 and 4, a plurality of ball members (110), each of a sphere shape, may be arranged at a floor surface of the frame member (32). By way of non-limiting example, as illustrated in FIGS. 3 and 4, in a case the frame member (32) is provided with a cubic shape, the ball member (110) may be insertedly and rotatably installed at each of four corners of the frame member (32). The reason of installing the ball member (110) at each of the four corners of the frame member (32) is to prevent interference with the magnet (33). Because the ball member (110) is provided with the spherical shape, a frictional force interrupting a rolling operation of the ball member (110) can be minimized by maintaining a surface-contact with the surface opposite to the PCB (10).

The ball guide (120) is installed to prevent the ball member (110) from being separated from a floor surface of the frame member (32), and, as illustrated in FIG. 4, prevents the ball guide (120) and the ball member (110) from being separated by gripping both lateral surfaces of the ball member (110). At this time, although the ball member (110) may be prevented from being separated by the ball guide (120), the rotational direction is not restricted. Thus, the ball member (110) can freely rotate along a moving direction of the frame member (32).

Thus, a contact surface between the ball member (110) and the PCB (10) is always being point-contacted to minimize the frictional force, because the ball member (110) moves by rolling on an upper surface of the PCB (10) in a case the frame member (32) is moved by electromagnetic interaction between the coil unit (20) and the magnet (33).

According to the exemplary embodiment of the present invention thus configured, the frame member (32) may be guided on an upper surface of the PCB (10) by the ball guide unit (100), and movement to a direction parallel with the optical axis may be upwardly restricted by the guide frame (36), and basic position to a horizontal direction may be also guided. The shift to a direction parallel with the sensor surface of the image sensor (11) may be also controlled in response to changes in a current applied from the coil unit (20). Furthermore, in a case the coil unit (20) is installed at an upper surface of the PCB (10), the camera module can be more compactly configured over the coil unit configured on an inner surface of the cover member (40) to the advantage of miniaturization of device.

Meanwhile, although the above-mentioned description has exemplified a voice coil motor by way of configuration of an actuator performing the auto focusing function, the present invention is not limited thereto. By way of non-limiting example, the actuator performing the auto focusing function may be any one of a MEMS (Micro Electric Mechanical System) actuator capable of moving one sheet of lens, a MEMS piezoelectric actuator, a MEMS bimorph actuator, an MEMS thermal actuator, a MEMS magnetic actuator, a MEMS liquid actuator, a non-MEMS type actuator, a silicon type actuator, and a liquid lens, or any type of actuator that is configured by combination thereof.

The MEMS actuator using an electrostatic force applies a voltage to a pair of facing stationary combs perpendicularly projected from a planar surface and inserted into each other so that the electrostatic force generated between the two combs uniformly produces power depending on relative movement between the combs. The MEMS actuator (electrostatic comb-drive actuator) has an advantage of providing uniform power with respect to movement of one comb. The handshake compensation function may be realized by configuration of the optical axis to a horizontal shift movement according to a method of restricting a direction of degree of freedom of the pair of combs. The auto focusing function may be realized by configuration of the optical axis to a vertical shift movement.

The MEMS piezoelectric actuator and the MEMS bimorph actuator are configured in such a manner that in a case a predetermined size of voltage is applied to a piezoelectric element, a thin plate of transmissive material such as glass membrane is deformed using a principle of generating a displacement on the piezoelectric element, where a refractive index of transmissive light is adjusted to realize the auto focusing function or the handshake compensation function.

A MEMS thermal actuator is a micromechanical device that typically generates motion by thermal expansion amplification, where a small amount of thermal expansion of one part of the device translates to a large amount of deflection of the overall device, and where a temperature of a member is changed using a heating source such as an electric resistor and a refractive index of transmissive light is adjusted using deformation caused by difference in thermal expansion to thereby realize the auto focusing function or the handshake compensation function.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

The camera module according to exemplary embodiments of the present invention has an industrial applicability in that it can be applied to a camera module mounted at small electronic devices such as a mobile terminal and a tablet PC.

The invention claimed is:

1. A camera module, the camera module comprising:
    a PCB (Printed Circuit Board) mounted with an image sensor;
    a housing member disposed at an upper surface of the PCB;
    a bobbin disposed at an inner side of the housing member;
    a first coil unit disposed on an upper surface of the PCB;
    a second coil unit disposed at the bobbin;
    a magnet disposed at the housing member, and the magnet facing the first coil unit and the second coil unit;
    an elastic member coupled to the housing member and the bobbin; and
    a ball guide unit disposed between the housing member and the PCB,
    wherein the housing member is movable along the upper surface of the PCB by the ball guide unit.

2. The camera module of claim 1, wherein the housing member is movable to a direction parallel with a sensor surface of an image sensor mounted at the PCB in response to an electromagnetic interaction between the first coil unit and the magnet.

3. The camera module of claim 1, further comprising a cover member coupled to the PCB and mounted therein with the housing member.

4. The camera module of claim 1, wherein the first coil unit is installed at any one position of a surface of the PCB and an inside of the PCB, and the first coil unit has a pattern of a wound coil operating as an electromagnet, in a case a power is applied.

5. The camera module of claim 1, further comprising at least one lens disposed at the bobbin, and wherein the housing member includes a frame member mounted with the magnet.

6. The camera module of claim 5, wherein the magnet is installed at a wall surface of the frame member.

7. The camera module of claim 6, wherein the magnet is installed on the wall surface opposite to a bobbin of the frame member.

8. The camera module of claim 5, wherein the lens is installed at the bobbin arranged inside the frame member.

9. The camera module of claim 8, wherein the bobbin is wound with the second coil at a periphery opposite to the magnet.

10. The camera module of claim 9, wherein the bobbin is reciprocably installed to an axial direction at an inside of a space of the frame member in response to an electromagnetic interaction with the magnet.

11. The camera module of claim 5, wherein the at least one lens includes a lens formed with a variable lens to adjust refractive index of transmissive light.

12. The camera module of claim 5, wherein the lens is capable of moving any one of an extreme outer lens and an extreme rear lens.

13. The camera module of claim 5, wherein the ball guide unit is freely-rotatably installed at a floor surface of the frame member.

14. The camera module of claim 13, wherein the ball guide unit includes a ball member rotatably installed at a corner portion of the frame member, and a ball guide coupled to the floor surface of the frame member to prevent the ball member from being separated.

15. The camera module of claim 5, wherein the ball guide includes a grip unit for preventing the ball member from being separated by gripping both distal ends of the ball member.

16. The camera module of claim 5, wherein the elastic member is interposed between a cover member and the frame member to elastically support a movement to an axial direction of the bobbin centrally installed at the frame member.

17. The camera module of claim 16, further comprising a guide frame interposed between the cover member and the frame member to restrict a movement to an axial direction of the frame member and to guide a movement to a direction of the sensor surface of an image sensor.

18. The camera module of claim 17, wherein the guide frame is fixed in a state of being surface-contacted with the cover member.

19. The camera module of claim 17, wherein the guide frame is formed with an opening at a surface opposite to the bobbin.

20. A camera module comprising:
    a circuit board;
    a housing member at the circuit board;
    a bobbin at an inside of the housing member;
    a first coil unit at an upper surface of the circuit board;
    a second coil unit at the bobbin;
    a magnet at the housing member, and the magnet facing the first coil unit and the second coil unit;
    an elastic member coupled to the housing member and the bobbin; and
    a ball guide device between the housing member and the circuit board, wherein the ball guide device to move the housing member along the upper surface of the circuit board.

* * * * *